(12) United States Patent
Sato

(10) Patent No.: US 7,696,723 B2
(45) Date of Patent: Apr. 13, 2010

(54) BATTERY CHARGER, AND METHOD OF JUDGING CHARGING CONDITION

(75) Inventor: Masanao Sato, Fukushima (JP)

(73) Assignee: Sony Corporation, Tokyo (JP)

( * ) Notice: Subject to any disclaimer, the term of this patent is extended or adjusted under 35 U.S.C. 154(b) by 552 days.

(21) Appl. No.: 10/982,479

(22) Filed: Nov. 5, 2004

(65) Prior Publication Data
US 2005/0099161 A1    May 12, 2005

(30) Foreign Application Priority Data
Nov. 7, 2003    (JP) ............... P2003-378304

(51) Int. Cl.
*H02J 7/00* (2006.01)
(52) U.S. Cl. .................. 320/132; 320/150; 320/161
(58) Field of Classification Search ............ 320/132, 320/133, 150, 156, 157, 161
See application file for complete search history.

(56) References Cited

U.S. PATENT DOCUMENTS

| | | | | |
|---|---|---|---|---|
| 5,204,611 A | * | 4/1993 | Nor et al. ............... | 320/145 |
| 5,895,440 A | * | 4/1999 | Proctor et al. ........... | 702/63 |
| 5,998,968 A | * | 12/1999 | Pittman et al. .......... | 320/130 |
| 7,054,233 B2 | * | 5/2006 | Kibiloski et al. ........ | 368/67 |
| 2001/0000212 A1 | * | 4/2001 | Reipur et al. ........... | 320/104 |

FOREIGN PATENT DOCUMENTS

JP    2000358333 A  * 12/2000

* cited by examiner

*Primary Examiner*—Patrick Assouad
*Assistant Examiner*—Ramy Ramadan
(74) *Attorney, Agent, or Firm*—K&L Gates LLP

(57) ABSTRACT

A battery charger and a method of judging a charging condition of a secondary battery capable of judging precisely a charging condition of the secondary battery are provided. Charging conditions of the secondary battery are classified to four charging conditions depending on change of the voltage value of the secondary battery during charging operation, and one of these four charging conditions is displayed on the secondary battery by detecting the voltage value of the secondary battery at predetermined intervals.

15 Claims, 10 Drawing Sheets

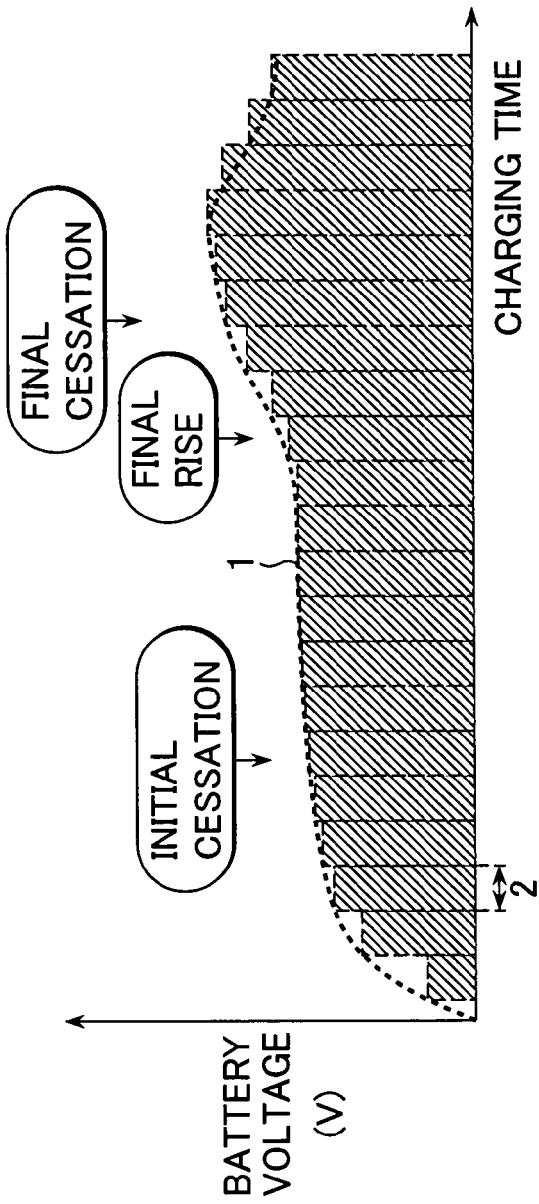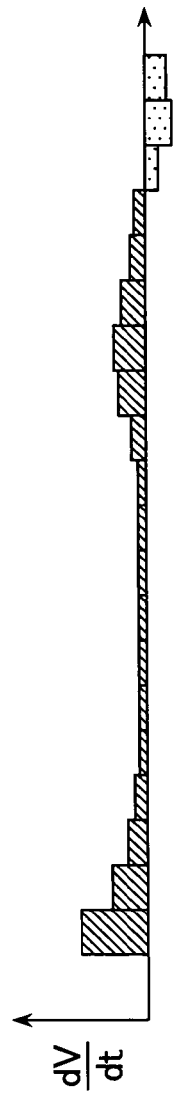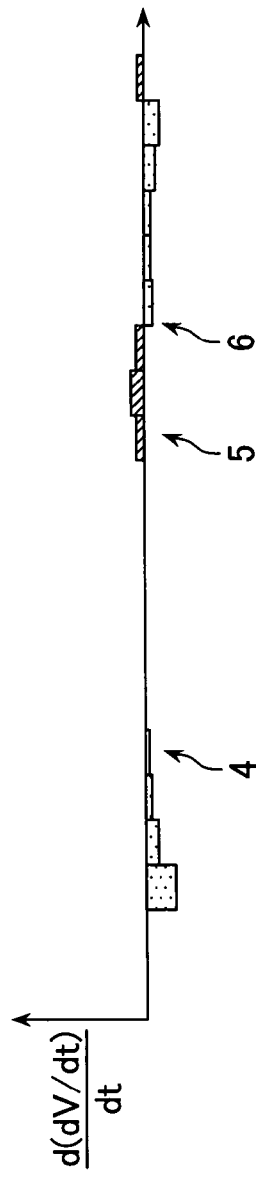

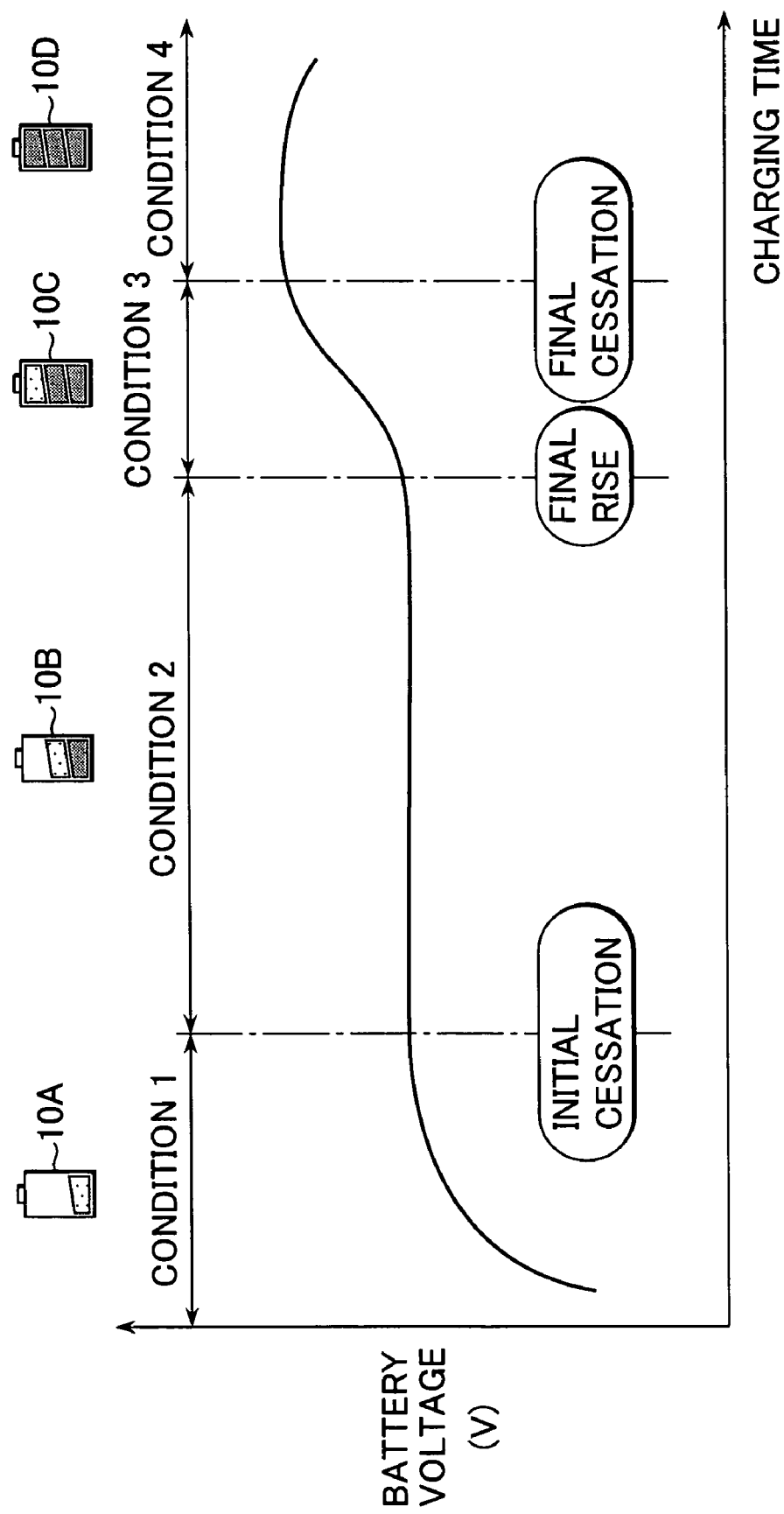

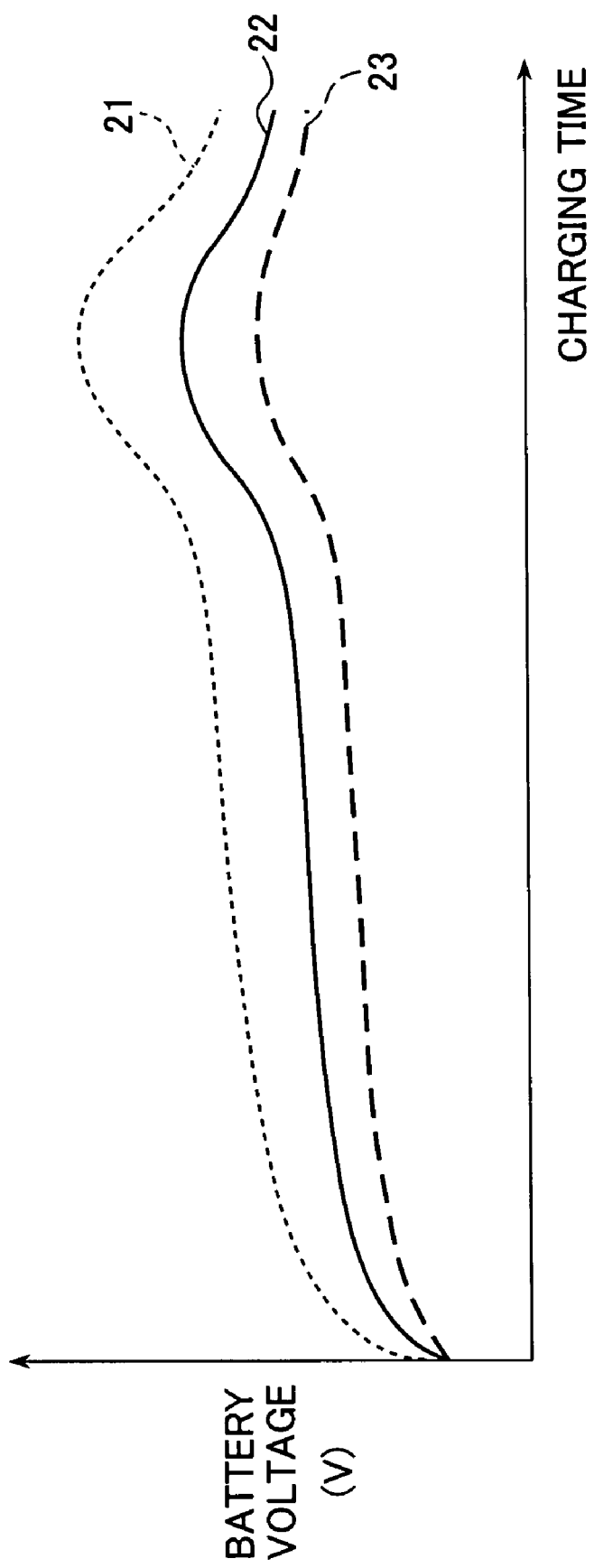

FIG.9

| TEMPERATURE T | BATTERY VOLTAGE V | CONDITION |
|---|---|---|
| T<0°C (LOW TEMPERATURE) | V<V1 | CONDITION 1 |
| | V1≦V<V2 | CONDITION 2 |
| | V2≦V | CONDITION 3 |
| 0°C≦T<40°C (NORMAL TEMPERATURE) | V<V3 | CONDITION 1 |
| | V3≦V<V4 | CONDITION 2 |
| | V4≦V | CONDITION 3 |
| 40°C≦T (HIGH TEMPERATURE) | V<V5 | CONDITION 1 |
| | V5≦V<V6 | CONDITION 2 |
| | V6≦V | CONDITION 3 |

BATTERY CHARGER, AND METHOD OF JUDGING CHARGING CONDITION

CROSS REFERENCE TO RELATED APPLICATION

This application claims priority to Japanese Patent Document No. 2003-378304, filed on Nov. 7, 2003 with the Japanese Patent Office, which disclosure in its entirety is hereby incorporated by reference.

BACKGROUND OF THE INVENTION

The present invention relates to a battery charger capable of indicating charging condition of a secondary battery, and a method of judging its charging condition.

Generally, a residual electricity (capacity) checker for a primary battery such as an alkali dry cell and a manganese dry cell is a type where voltages of such battery are segmented into plural steps by predetermined threshold voltages and residual electricity is indicated in accordance with the steps. Such configuration becomes possible because a primary battery has the characteristic in which higher the voltage of the battery is, larger the residual electricity becomes.

However, in a secondary battery such as a nickel metal hydride battery (Ni/MH battery) or a nickel cadmium battery (Ni/Cd battery), since the open loop voltage remains substantially unchanged when it is fully charged or it is close to the fully charged condition except there is essentially no residual electricity, measurements of the battery voltage do not present any means to know how much is the residual electricity of the battery. Additionally, even in secondary batteries having the same electrical capacity, battery voltages may change depending on temperature, frequency of degradation (aging) and activation condition, thereby making it very difficult to know the residual electricity by measuring the voltage.

Such phenomena of secondary batteries also apply to the closed loop voltage when the batteries are being charged. Accordingly, in order to detect (indicate) the progress of charging in nickel metal hydride batteries or nickel cadmium batteries, it was conventional to completely discharge the batteries before charging and calculate the ratio of the measured charging time with respect to the standard time required for fully charging. However, even in such method, it is impossible to accurately detect the progress of charging if the rated capacity of the battery to be charged may change.

Some of conventional battery chargers for nickel metal hydride batteries have capacity checkers. However, such capacity checkers indicate whether the batteries are in the completely discharged condition or in the fully charged condition and thus fail to indicate the battery capacity in steps.

SUMMARY OF THE INVENTION

The present invention relates to a battery charger capable of indicating charging condition of a secondary battery, and a method of judging its charging condition.

The present invention provides in an embodiment a battery charger and a method of judging its charging condition in which the residual capacity of the secondary battery under charging (i.e., the progress of charging) can be detected accurately.

In another embodiment, the present invention provides a battery charger and a method of judging its charging condition in which the remaining capacity of any secondary battery can be detected regardless of the charging condition without completely discharging prior to charging.

The present invention in an embodiment is a battery charger which include, a charging device for charging a secondary battery, voltage detector for detecting the voltage value of the secondary battery, and controller for receiving voltage values of the secondary battery as detected by the voltage detector at a predetermined time interval while the secondary battery is being charged by the charger and for judging the charging condition of the secondary battery based on the rate of change of the received voltage values.

The present invention in an embodiment is a battery charger which includes a charger for charging a secondary battery, voltage detector for detecting voltage values of the secondary battery, and controller for receiving voltage values of the secondary battery as detected by the voltage detector at a predetermined time interval while the secondary battery is being charged by the charger, for judging a first charging condition of the secondary battery based on the rate of change of the received voltage values, for judging a second charging condition of the secondary battery depending on whether or not the received voltage value falls within the range of predetermined threshold voltage values and judging the first charging condition as the charging condition of the secondary battery when the first charging condition and the second charging condition agree with each other, wherein the predetermined threshold values are switched in response to the ambient temperature.

The present invention in an embodiment is a method of judging charging condition which includes a charging step of charging a secondary battery, a voltage detection step of detecting voltage values of the secondary battery, and a controlling step of receiving the voltage values of the secondary battery as detected by the voltage detection step at a predetermined time interval while the secondary battery is being charged by the charging step and judging the charging condition of the secondary battery based on the rate of change of the received voltage values.

The present invention in an embodiment is a method of judging charging condition which includes a charging step of charging a secondary battery, a voltage detection step of detecting voltage values of the secondary battery, and a controlling step of receiving the voltage values as detected by the voltage detecting step while the secondary battery is being charged by the charging step at a predetermined time interval and judging a first charging condition of the secondary battery based on the rate of change of the received voltage values, judging a second charging condition based on whether or not the received voltage values fall within predetermined threshold values and judging the first charging condition is the charging condition of the secondary battery if the first charging condition and the second charging condition agree with each other, wherein the predetermined threshold values are switched in response to the ambient temperature.

According to an embodiment of the present invention, it is possible to provide a battery charger and a method of judging charging condition in which the remaining capacity of the secondary battery under charging (i.e., progress of the charging) by detecting the change in charging curve. It is also possible to provide a battery charger and a method of judging charging condition in which the remaining capacity of a secondary battery of any remaining capacity condition can be accurately understood without completely discharging prior to charging.

Moreover, according to an embodiment of the present invention, it is also possible to provide a clear indication of the progress of charging or discharging of an individual secondary battery which is difficult to indicate by simple detection of the battery voltage, thereby allowing the user to understand the charging condition in steps.

Additional features and advantages of the present invention are described in, and will be apparent from, the following Detailed Description of the Invention and the figures.

BRIEF DESCRIPTION OF THE FIGURES

FIGS. 1A to 1C show curves of battery voltage of a secondary battery for explaining characteristics of a charging curve.

FIG. 2 shows a curve of battery voltage describing a transition of a condition.

FIG. 3 shows a graph for describing a difference in a curve of battery voltage depending on environmental temperature.

FIG. 9 shows a schematic diagram of a table designating threshold values at each environmental temperature.

DETAILED DESCRIPTION OF THE INVENTION

Figure 4C:
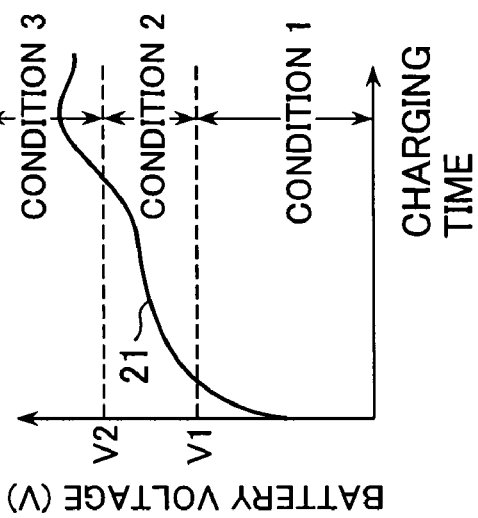
FIGS. 4A to 4C show graphs for describing threshold value preset on each environmental temperature.

The present invention relates to a battery charger capable of indicating charging condition of a secondary battery, and a method of judging its charging condition.

An embodiment of the present invention for detecting the charging condition of a secondary battery such as a nickel metal hydride battery or a nickel cadmium battery will be described in further detail below.

FIG. 1 shows how the battery voltage of a secondary battery such as a nickel metal hydride battery or a nickel cadmium battery changes during the process of charging. The graph as shown in FIG. 1A is a curve 1 (that is, a charging curve) showing changes in the battery voltage V in case of charging such battery from a substantially fully discharged condition up to a fully charged condition. The curve 1 is obtained by interconnecting open loop voltage values measured at a constant time interval 2. The constant time interval 2 is determined to be, for example, about 10 minutes in case of charging four secondary batteries to be charged and the time required for completing the charging is estimated to be 270 minutes, thereby providing 28 voltage measurement points. Preferably, the voltage is measured by discharging for about 2 seconds with a light load after terminating the charging.

As shown in the curve 1, the battery voltage exhibits two relatively large rising curves. That is, the battery voltage rises relatively sharply at an initial stage of the charging followed by an interval when the battery voltage remains substantially unchanged. Subsequently, the battery voltage rises again and then drops slightly after reaching the peak.

Herein, the point where the initial sharp voltage rising curve slows down is known as an "initial cessation". The point where the voltage curve sharply rises again is known as a "final rise". Further, the point where the voltage rise curve slows down after the final rise (or just before the peak point of the voltage) is known as a "final cessation". As described hereinabove, it is known in charging a secondary battery such as a nickel metal hydride battery or a nickel cadmium battery that the battery voltage changes in such a predetermined pattern. In the present invention, such characteristic pattern is utilized for detecting the charging condition of the secondary battery under charging. This enables the user to properly understand the charging condition of the battery regardless of the change in the charging curve due to environmental temperature (ambient temperature) or deterioration rate as long as the above characteristic pattern remains.

The rate of change in a small time interval (dt) 2 of the battery voltage as represented by the curve 1 in FIG. 1A (i.e., a primary differentiation of the battery voltage V, that is dV/dt) is as shown in FIG. 1B. Moreover, the rate of change of the respective changes as shown in FIG. 1B (i.e., secondary differentiation of the battery voltage V, that is d(dV/dt)/dt) is as shown in FIG. 1C.

In FIG. 1C, a point (point 4) where the absolute value of the negative difference reaches a predetermined small value after appearing the initial negative difference corresponds to the initial cessation. Subsequently, a point (point 5) where the difference becomes a positive difference larger than a constant value corresponds to the final rise. A point (point 6) where the voltage rise becomes dull again, i.e., where the negative difference is larger than a constant absolute value corresponds to the final cessation. Accordingly, it is possible to recognize the above-mentioned respective points based on the difference of the voltages of the secondary battery under charging as measured at a constant time interval and the difference between voltage differences.

Now, reference is made to FIG. 2 for describing the charging condition of the battery voltage. FIG. 2 shows the curve similar to the one as shown in FIG. 1A. As apparent from the above description made by reference to FIG. 1, it is generally possible to detect the points for the initial cessation, the final rise, and the final cessation. Herein, conditions between these points are referred to as condition 1 through condition 4 as shown in FIG. 2. That is, the condition 1 is the condition from (essentially) no battery capacity up to the initial cessation point. The condition 2 is from the initial cessation point to the final rise point. The condition 3 is from the final rise point to the final cessation point. The condition 4 is from the final cessation point to the fully charged condition.

Moreover, condition signs 10A through 10D are given to the respective conditions. As will be described hereinafter, the condition signs (icons) 10A through 10D are displayed on a display unit of the battery charger according to the present invention in order to indicate the charging condition of the corresponding secondary battery, thereby enabling the user to instinctively understand the current charging condition of the battery.

In charging a secondary battery such as a nickel metal hydride battery or a nickel cadmium battery, there is another feature with respect to environmental temperature (ambient temperature). This feature will be described hereunder by reference to FIG. 3 and FIG. 4.

Three curves 21, 22 and 23 as shown in FIG. 3 indicate the trend in battery voltage of the secondary battery under charging similar to the curve 1 in FIG. 1A. It is to be noted here that the curve 21 shows a case where the environmental temperature (or ambient room temperature) is low, the curve 22 shows a case where the environmental temperature is normal, and the curve 23 shows a case where the environmental temperature is high temperature. Accordingly, FIG. 3 shows that the measured battery voltage is entirely high when the environmental temperature is lower.

By utilizing such characteristic of the charging curve, the threshold value setting is changed depending on the temperature for judging the charging condition. FIG. 4 shows how the threshold value is changed to judge the charging voltage for the curves 21, 22 and 23 in FIG. 3. FIG. 4A shows the curve 23 representing the change in battery voltage under high environmental temperature condition, in which a predetermined threshold value is set to make a judgment of the condition 1 through the condition 3. Each of the condition 1 to 3 corresponds to each of the condition 1 to 3 as shown in FIG. 2. As shown in FIG. 1 and the like, since the battery voltage drops as the charging time progresses at the area near the full charge, the condition 4 can not be judged by the above-mentioned predetermined threshold value.

In this example, it is judged to be the condition 1 when the voltage is lower than V5, to be the condition 2 when the voltage is equal to or higher than V5 and lower than V6, and to be the condition 3 when the voltage is V6 or higher.

Figure 4B:
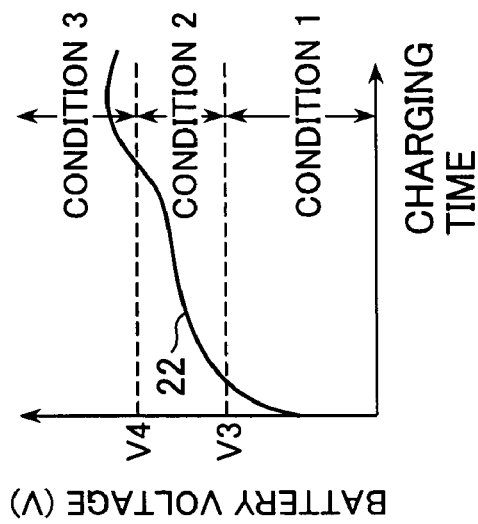
Figure 4A:
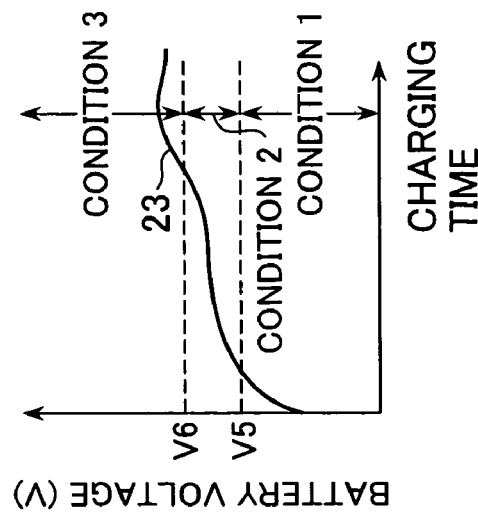

Shown in FIG. 4B is the curve 22 representing the change in battery voltage when the environmental temperature is normal. It is judged to be the condition 1 when the voltage is lower than V3, to be the condition 2 when the voltage is V3 or higher and lower than V4, and to be the condition 3 when the voltage is V4 or higher.

As understood from FIG. 4, the threshold values V5 and V6 under high temperature condition are set to be lower than the threshold values under other temperature conditions, while the threshold values V1 and V2 under the low temperature condition are set to be higher values than under other temperature conditions. By using different threshold values for respective environmental temperatures in the above manner, it is possible to relatively accurately detect the charging condition.

In case of using the method of judging charging condition using the rate of change in battery voltage as described by reference to FIG. 1 and FIG. 2, there is no need to use the method of judging charging condition by comparing the battery voltage and the threshold values for respective environmental temperatures. In case of fully discharging to essentially no battery capacity (so-called refreshing) prior to charging a secondary battery, the change in the battery voltage can be recognized from the very beginning. However, in case of starting to charge from the condition where there are certain remaining battery capacity, since the progress of the battery voltage up to that point is unknown, it is impossible to understand the charging condition of the battery at the time of starting the charging, thereby making it difficult to identify the correspondence of the rise and the end of rise appearing after the start of charging and the characteristic points.

Accordingly, it is effective in such a case to employ the present method to recognize the charging condition at the time of starting the charging.

Figure 5:
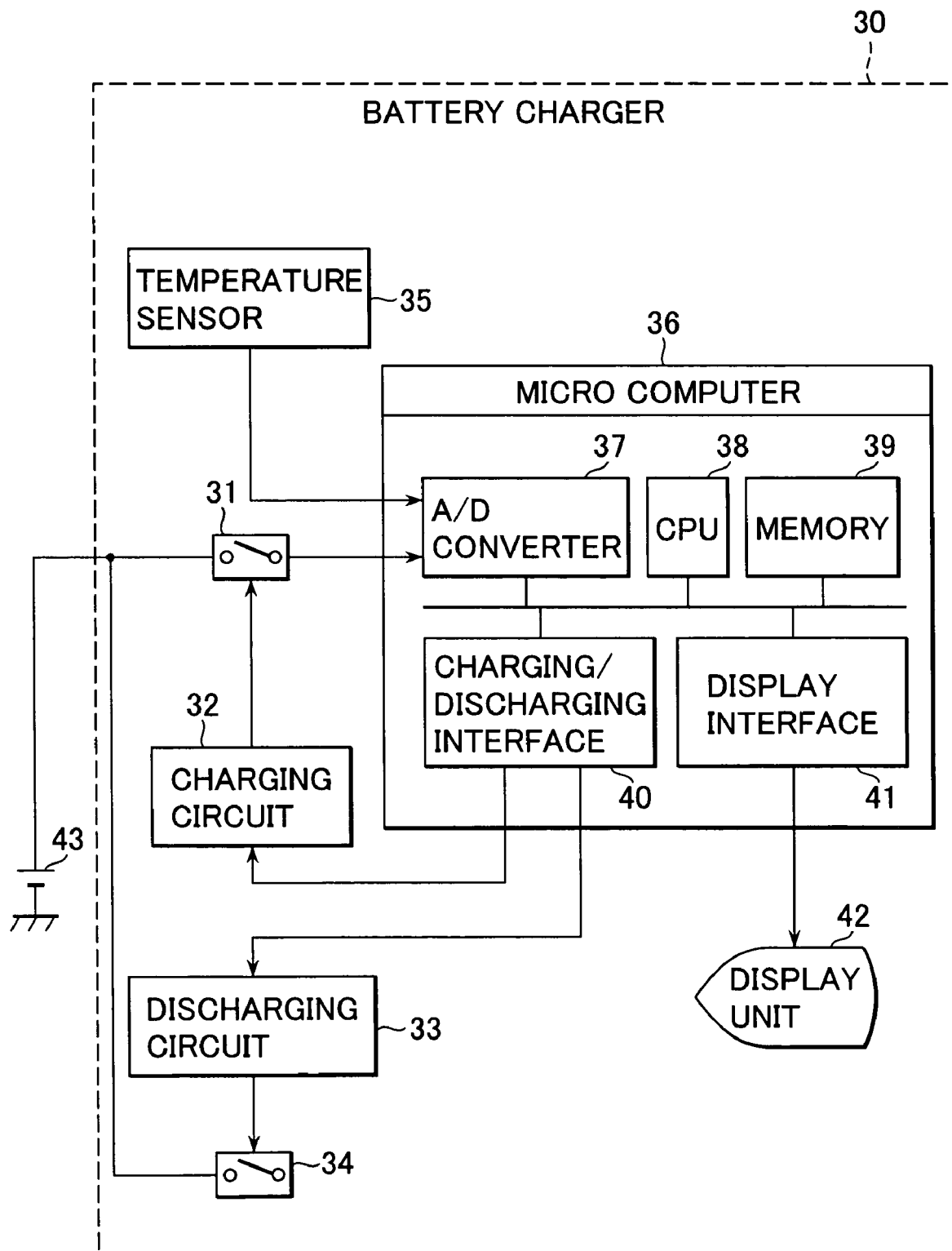
FIG. 5 shows a block diagram designating a configuration of a charger relating to an embodiment of the present invention.

Now, a battery charger 30 according to an embodiment of the present invention will be described by reference to FIG. 5. The battery charger 30 includes a charging switch 31, a charging circuit 32, a discharging circuit 33, a discharging switch 34, a temperature sensor 35, a microcomputer 36, and a display unit 42. Furthermore, the microcomputer 36 includes an A/D (analog-to-digital converter) 37, a CPU (Central Processing Unit) 38, a memory 39, a charging/discharging I/F (InterFace) 40, and a display I/F 41.

The battery charger 30 includes a holder (not shown) for holding a secondary battery 43 for charging or discharging purpose. The display unit 42 is disposed on the surface of the case of the holder for displaying various kinds of information relating to charging/discharging. The holder is designed for accommodation, for example, up to four secondary batteries 43, thereby enabling to charging from one to four secondary batteries 43 simultaneously.

The charging circuit 32 controls ON/OFF of the charging switch 31 in order to supply a charging current to the secondary battery 43. On the other hand, the discharging circuit 33 controls ON/OFF of the discharging switch 34 in order to discharge the secondary battery 43. The charging circuit 32 and the discharging circuit 33 which are used herein may be any conventional general circuits. The charging switch 31 and the discharging switch 34 may be, for example, switching circuits comprising transistors.

The A/D converter 37 receives the discharging voltage of the secondary battery 43 and converts it into a digital format. In case of providing the temperature sensor 35, the A/D converter 37 also receives the output therefrom and converts it into a digital signal. The CPU 38 controls the operation of various constituent elements of the battery charger 30 based on the instructions from a program loaded on the memory 39. The program may be provided as a ROM (Read-Only Memory) data at the production time or may be provided from predetermined recording means or obtained from a recording medium such as a CD-R (Compact Disk Read-Only Memory) or the like, or by way of a network or the like.

One of the functions to be provided by the control of the CPU 38 is a charging/discharging control function. The CPU 38 sends instructions to the charging circuit 32 and the discharging circuit 33 by way of the charging/discharging I/F 40 in order to control charging and discharging of the secondary battery 43. Also, the CPU 38 controls the charging circuit 32 and the charging switch 31 to allow the discharge voltage of the secondary battery 43 to be applied to the A/D converter 37, and the digital signal representing such voltage is received from the A/D converter 37.

The CPU 38 repeats to receive the digital signal that is received from the discharge voltage of the secondary battery 43 at a predetermined time interval and differences between the discharge voltages are calculated to make judgment of the current charging condition of the secondary battery 43. The judgment is performed by storing all measured voltage values from the start of charging in the memory 39 and calculating the difference between the last voltage value and the latest voltage value and further calculating the difference from the previous difference. Such judgment is performed for each secondary battery 43 accommodated in the holder of the battery charger 30.

Another function to be provided by the control of the CPU 38 is a display control function. The CPU 38 selects the condition signs corresponding to the charging conditions of the secondary battery 43 judged in the manner as described hereinabove and the corresponding images are transmitted to the display I/F 41 in the data format that can be displayed. The display I/F 41 transmits the images the display unit 42 that displays the images. The display unit 42 is, for example, an LCD (Liquid Crystal Display) and the displays are updated at a predetermined time interval. Accordingly, in case when it is judged by the CPU 38 that charging condition is changed from the condition 2 to the condition 3, the display is switched from the condition sign 10B to the condition sign 10C as shown in FIG. 2. It is also possible to use such display device as LEDs (Light Emitting Diodes). In this case, a first LED blinks to indicate the condition 1, a second LED blinks to indicate the condition 2, so on and so forth to indicate respective charging conditions.

Figure 6:
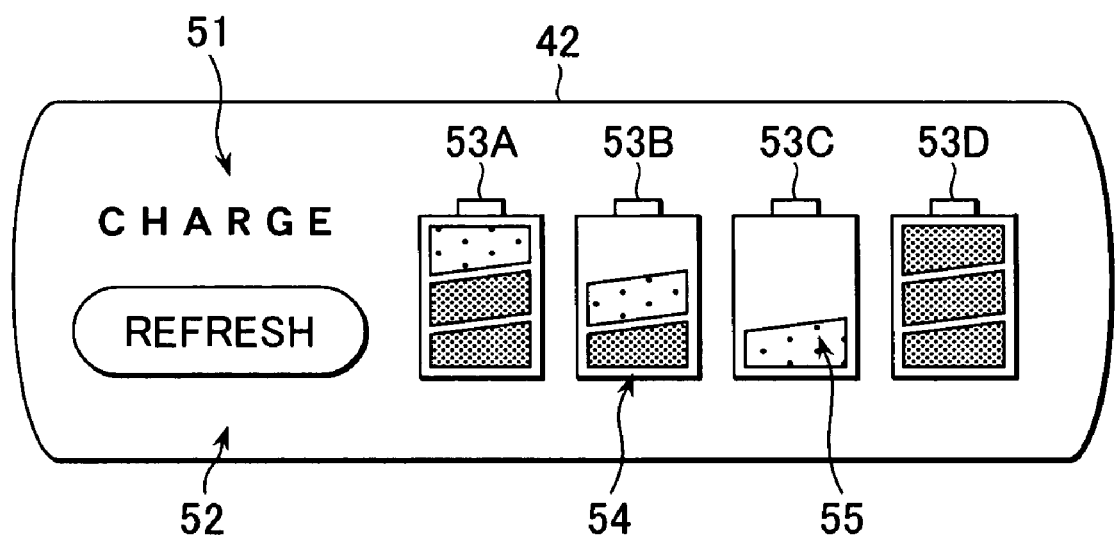
FIG. 6 shows a schematic diagram exemplifying display contents displayed on a display unit of a charger relating to an embodiment of the present invention.

FIG. 6 is an example of display on the display unit 42. Displayed at the top left portion on the display unit 42 is a character "CHARGE" 51 to indicate that the battery is under charging. A character "REFRESH" 52 at the left bottom indicates that the so-called refresh function is in operation. Refresh is to activate the battery for compulsively discharge the battery capacity until no capacity remains. Repeated charging and discharging of a secondary battery such as a nickel metal hydride battery on the halfway may accelerate non-activation, thereby decreasing apparent battery capacity. This is the reason why such function is provided.

Displayed at the right side of the display unit 42 are four condition signs 53A to 53D. They indicate the charging conditions of the four secondary batteries 43 accommodated in the holder of the battery charger 30. By making reference also to the condition signs 10A to 10D as shown in FIG. 2, it is understood that the accommodated secondary batteries 43 are in the condition 3, the condition 2, the condition 1, and the condition 4 sequentially from the left. It is to be noted that areas as indicated by the reference numeral 54 are, for example, lit at a high intensity, while areas as indicated by the reference numeral 55 are blinked, for example, at a period of 1 second. This means that the displayed images will have wider areas lit at a high intensity as the charging progresses.

Figure 7:
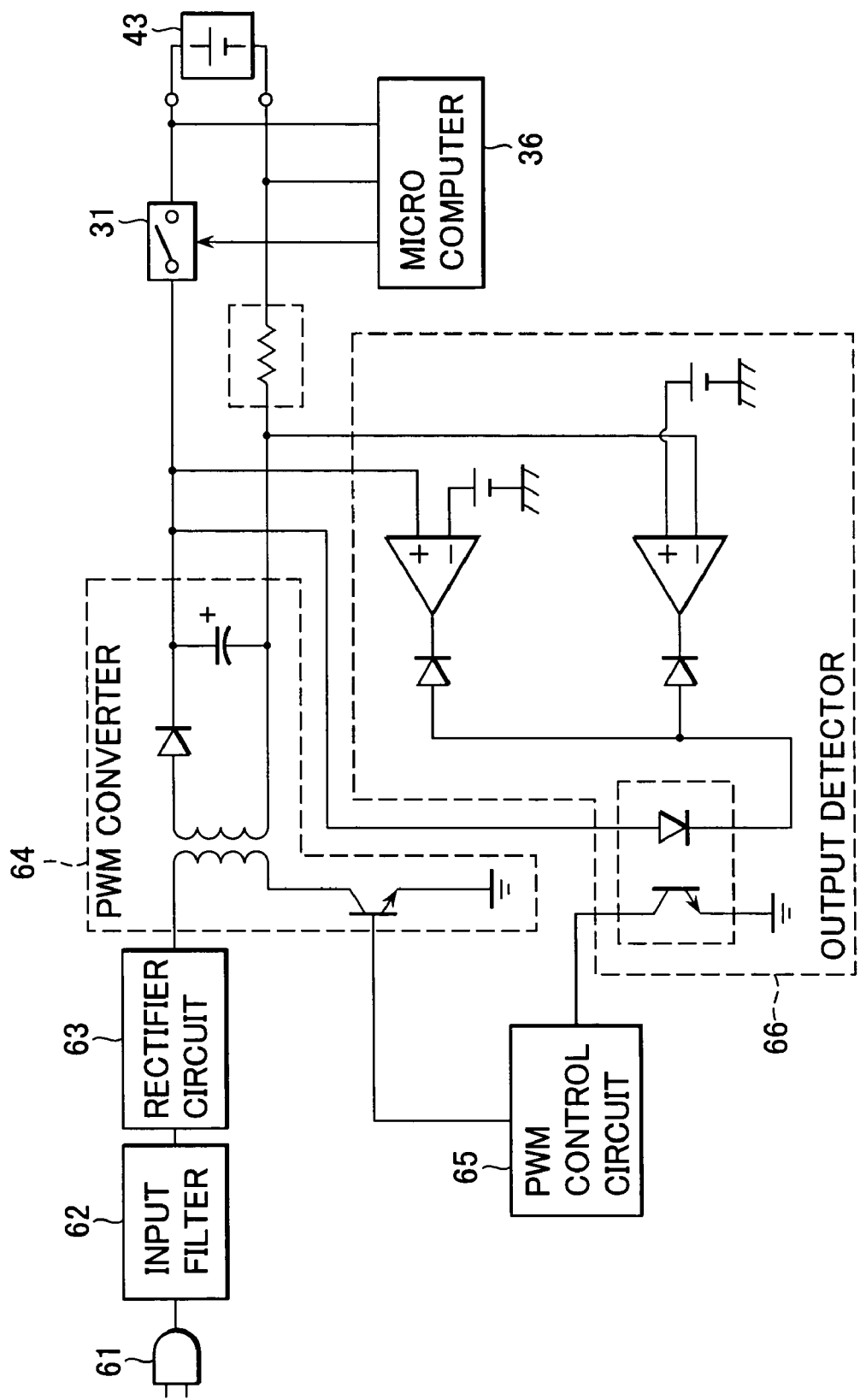
FIG. 7 shows a block diagram designating a configuration of a charging circuit of a charger relating to an embodiment of the present invention.

FIG. 7 shows the charging circuit 32 together with the relating elements. The charging circuit 32 is, for example, a switching power supply circuit, and comprises a power supply terminal 61 such as an outlet or the like for connecting to an external power supply such as a commercial power supply or the like, an input filter 62 connected to the power supply terminal 61, a rectifier circuit 63 connected to the input filter 62, a PWM (Pulse Width Modulation) converter 64 for stepping up/down the alternating voltage supplied from the rectifier circuit 63 for charging, an output detector 66 for detecting the output voltage to be supplied from the PWM converter 64 to the secondary battery 43, and a PWM control circuit 65 for controlling the PWM converter 64 based on the information that is detected by the output detector 66.

As described hereinabove, the CPU 38 in the microcomputer 36 controls the charging circuit 32 as well as the charging switch 31 and the output voltage of the secondary battery 43 is supplied to the A/D converter 37 in the microcomputer 36.

Now, flows of the processing of the charging/discharging control function and the display control function will be described by making reference to the flowchart in FIG. 8. Firstly, in step S1, discharging processing is performed for several seconds (for example, 2 seconds). This discharge is carried out with a small load such as about 0.2 C (0.2 C discharge). This is effective to avoid a large change in the measured battery voltage due to difference in temperature or frequency of degradation, thereby providing relatively stable voltage measurements. The 0.2 C discharge means herein that the battery is discharged with a light load of about 20% of the rated capacity of the battery.

In step S2, the discharge voltage of the secondary battery 43 is acquired by the A/D converter 37 and sampling of the output signal is performed for providing the sampled values to the CPU 38. Subsequently, in step S3, the sampled values (battery voltages) are compared with predetermined threshold values for making judgment of the charging condition at the start of charging. Since the environmental temperature is not taken into consideration in this example, for example, the threshold values for the normal temperature as shown in FIG. 4B are used to make a judgment whether it is the condition 1, the condition 2 or the condition 3. Moreover, the control is made to display the condition sign corresponding to the judged condition on the display unit 42.

Subsequently, in step S4, a charging current is supplied to the secondary battery 43 from the charging circuit 32 for a constant time. In step S5, a decision is made if the secondary battery 43 reached the full charge condition. As described hereinabove in connection with FIG. 1 and FIG. 2, it is determined that the fully charged condition has been reached when the final cessation in the charging curve is detected.

If it is in the fully charged condition, then the processing moves to step S13 and the charging is terminated and ends the processing by displaying the condition sign corresponding to the fully charged condition (condition 4) on the display unit 42. This completes the series of charging operation.

If it is determined that the full charge condition is not reached yet, the processing moves to step S6 and it is checked if a constant time (for example, such interval as 5 minutes or 10 minutes) lapses. If the time does not lapse, then the flow returns to step S5 to repeat the judgment if the fully charged condition is reached. If the time lapses, then goes to step S7 to stop the charging and sampling of the battery voltage is carried out in step S8.

The reason to stop the charging in step S7 is to obtain more stable voltage values. In order to obtain more stable voltage values, it is preferable to discharge for several minutes with a light load. However, since the step is repeated in a predetermined time interval, addition of such discharge step causes a problem to extend the overall charging time. Accordingly, in this example, the discharging step is omitted. It is, of course, possible to carry out the discharging step in consideration of the trade-off between accuracy of the voltage measurements and the overall charging time.

In step S9, judgment is made if the initial cessation is detected based on the battery voltage thus measured and battery voltages that were measured previously. If the initial cessation is detected, it indicates that it is now the condition 2 and the processing goes to step S10 in which the display unit 42 and the like are controlled for displaying the condition sign corresponding to the condition 2.

Such condition always transits from the current condition to the next condition. As a result, only judgment of the condition subsequent to the condition as judged in step S3 will be made. This means that, if it is determined to be, for example, in the condition 2 in step S3, the processing goes to step S11 by skipping step S9.

In step S11, judgment is made if the final rise is detected based on the measured battery voltage and the previously measured battery voltages. If the final rise is detected, it means that it is now the condition 3. In step S12, the display unit 42 and the like are controlled to display the condition sign corresponding to the condition 3.

Similar to step S9, judgment is made herein only for the subsequent conditions to the condition as judged in step S3. This means that, if it is judged to be, for example, the condition 3 in step S3, the flow goes to step S4 by skipping step S11.

If the initial cessation or the final rise is detected in step S9 and step S11 or if it is detected and the condition sign corresponding to the condition 2 or the condition 3 is displayed, the processing returns to step S4 in order to restart the charging.

Since no environmental temperature is referenced in an embodiment, the temperature sensor 35 is not an essential constituent element. Also, it is to be noted that the flowchart as described hereinabove is basically applicable to each of secondary batteries 43. Accordingly, in case of charging four secondary batteries 43, the processing based on the above flowchart is carried out in parallel for the respective batteries. For example, it is also possible to configure so as to carry out the processing totally for all of the secondary batteries 43 or separately for groups of a few batteries.

Figure 8:
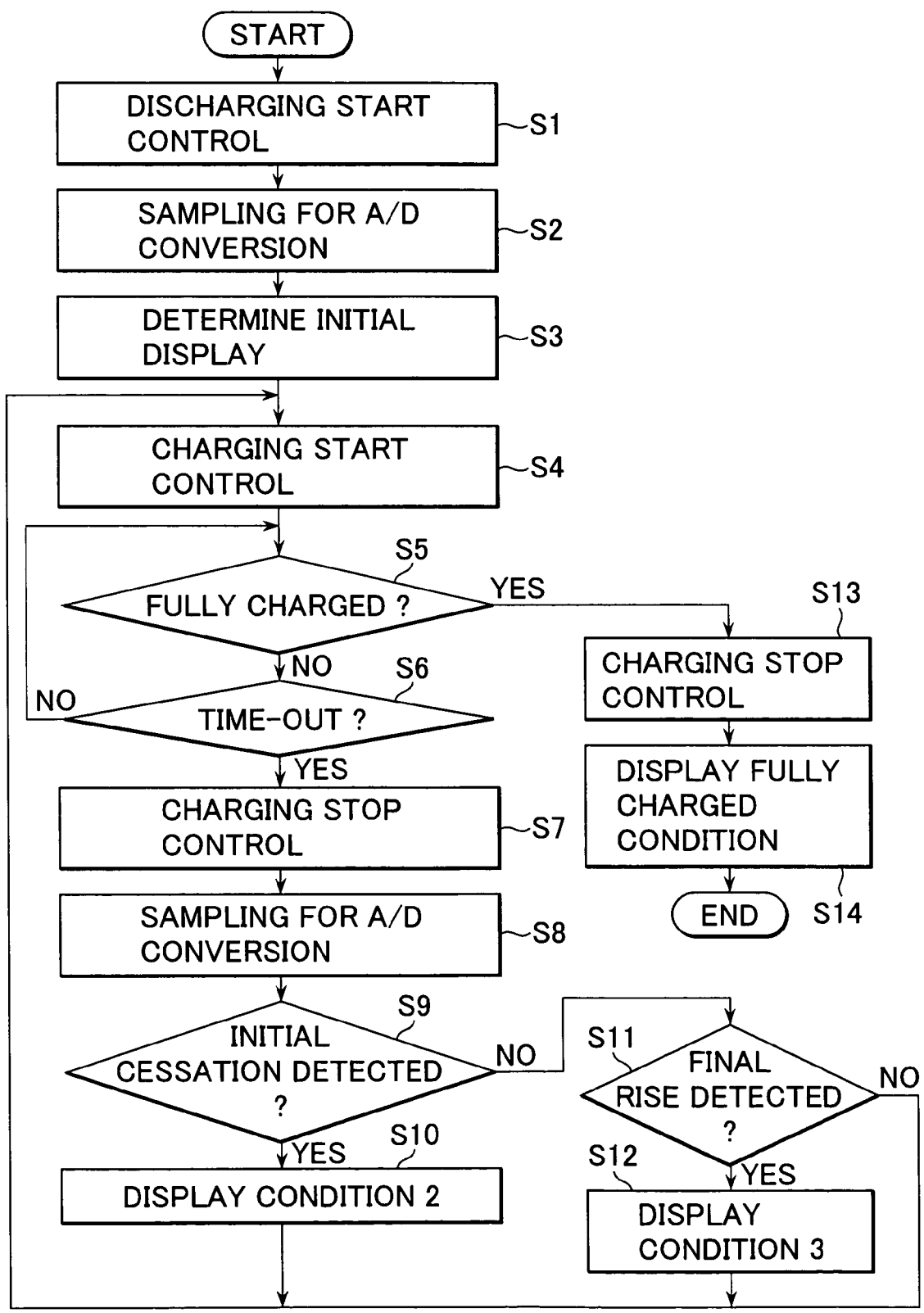
FIG. 8 shows a flowchart designating procedure of a charging/discharging control and a display control of a charger relating to an embodiment of the present invention.

An improvement in step S3 in the flowchart for the first embodiment as shown in FIG. 8 according to another embodiment. In making the judgment of the charging condition of the secondary battery (or batteries) 43 based on the initially measured battery voltage at the start of charging, the environmental temperature is taken into consideration. Since the battery voltage to be measured defers depending on environmental temperature even for the same charging condition as described above in connection with FIG. 3 and FIG. 4, the threshold values for making judgment of the charging condition are changed depending on temperature.

The CPU 38 acquires the measured battery voltages by way of the A/D converter 37 together with the temperature data from the temperature sensor 35. The output from the temperature sensor 35 is supplied to the A/D converter 37 that provides the digital data representing the room temperature to the CPU 38. The temperature sensor 35 is a sensor such as, for example, a thermistor. This may be practiced in an embodiment even in case of no temperature sensor 35 if the data representing the room temperature is made available to the CPU 38 by way of any input means such as, for example, a keyboard.

Then, the CPU 38 makes a judgment of the charging condition of the secondary battery at the start of charging based on the acquired battery voltage and the temperature data and displays the condition sign corresponding to the judged condition on the display unit 42. The judgment is made using a table such as, for example, the one as shown in FIG. 9. Corresponding columns in the table are selected based on the acquired temperature and the battery voltage and the conditions corresponding to the columns are selected as the judged conditions. It is to be noted herein that the respective battery voltages as shown in FIG. 9 are the same as the ones in FIG. 4 and the following relationship is applicable:

$$V5<V3<V1<V6<V4<V2$$

In this manner, the acquired battery voltage is judged to be the condition 1 if the temperature is in a certain range, while judging to be the condition 2 in another temperature, thereby resulting in making more accurate judgment of the charging condition.

It is a matter of choice in the table how to set temperature ranges for the low temperature, the normal temperature and the high temperature, how to set the voltages V1 to V6 and how many steps are set for the temperature. What is illustrated in FIG. 9 is an example illustrative of the present invention and thus the scope of the present invention should not be deemed restricted to such example.

Figure 10:
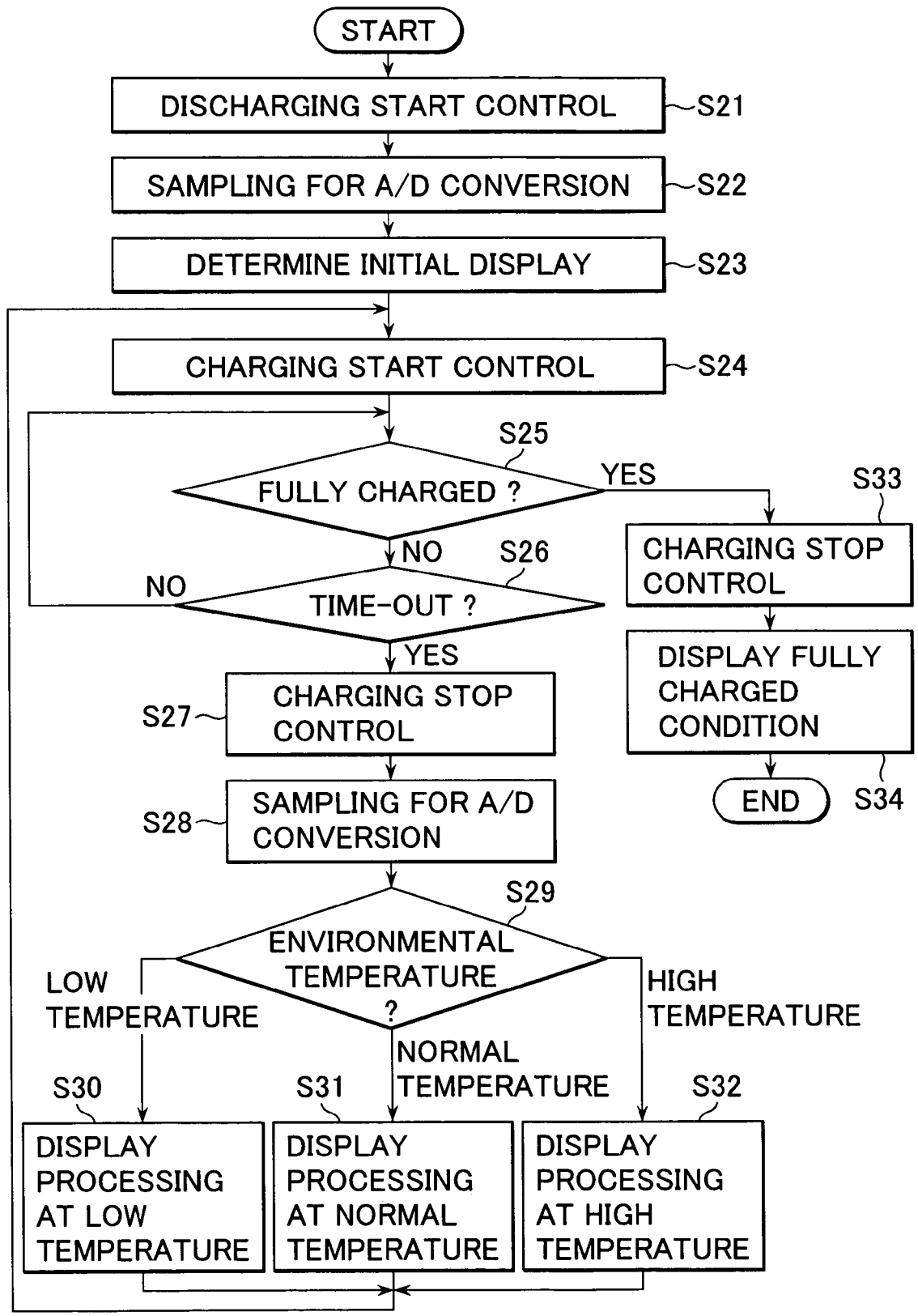
FIG. 10 shows a flowchart designating procedure of a charging/discharging control and a display control of a charger relating to a third embodiment of the present invention.

In another embodiment, a battery charger is provided in which the charging condition of the secondary battery is judged based on the environmental temperature and the battery voltage. Processing steps of the embodiment will be described by reference to the flowchart in FIG. 10. Firstly, in step S21, a discharging processing is carried out for several seconds (for example, 2 seconds). The charging is carried out with a small load such as about 0.2 C similar to the case, as previously discussed.

In step S22, acquired by the A/D converter 37 is the discharge voltage of the secondary battery 43. Sampling is performed on the output signal for providing the sampled values to the CPU 38. Subsequently, in step S23, the sampled values (battery voltages) are compared with predetermined threshold values to make a judgment of the charging condition at the start of charging. Since environmental temperature is not taken into consideration in this example, a judgment is made if the battery is in the condition 1, the condition 2, or the condition 3 using the threshold values for the normal temperature as shown in FIG. 9. Furthermore, a control is made to display the condition sign corresponding to the judged condition on the display unit 42.

It is also possible to improve step S23 so as to make a judgment of the charging condition by taking the environmental temperature into consideration using the table as shown in FIG. 9 like the case in the second embodiment.

Subsequently, in step S24, a charging current is supplied to the secondary battery 43 from the charging circuit 33 for a constant time. In step S25, a judgment is made if the secondary battery 43 reaches the full charge.

In case of fully charged condition, the flow goes to step S33 in which the charging is terminated to end the processing by displaying the condition sign corresponding to the fully charged condition (condition 4). The foregoing steps complete a series of charging operation.

If it is judged that the fully charged condition is never reached yet, the processing goes to step S26 in which a judgment is made if a constant time lapses. If not lapses yet, the processing returns to step S25 in order to repeat the judgment for the fully charged condition. If the constant time lapses, the charging operation is terminated in step S27 and sampling of the battery voltage is carried out in step S28.

In step S29, a judgment of the charging condition is made based on the battery voltage thus measured and the temperature as acquired by way of the temperature sensor 35 and the A/D converter 37.

If the temperature is in the low temperature, the flow goes to step S30 and the condition is judged using the threshold values for low temperature. The threshold values in this case may be, for example, those in the table in FIG. 9. If the condition is judged, the condition sign corresponding to such condition is displayed on the display unit 42.

Similarly hereinafter, in step S31, a judgment at the normal temperature is made and a judgment and a display at the high temperature are made in step S32. After step S30, step S31, or step S32, the processing returns to step S24 again in order to start charging.

Yet another embodiment according to the present invention will be described below in greater detail. This embodiment integrates at least some of the embodiments discussed above to enhance accuracy of judging the charging condition. Describing more in detail, on one hand, the charging condition is judged from the charging curve as is the case previously discussed. On the other hand, the charging condition is judged from the environmental temperature and the threshold values as is the case as also discussed above. Thereafter, these two judgment results are compared. If they agree to each other, the charging condition is determined to be the judged charging condition.

On the contrary, if these two judgment results differ from each other, it is possible to construct, for example, such that the immediate previous charging condition is maintained or either one of the judgment results is prioritized.

Although embodiments have been described to detect the charging condition using the change in the charging curve and voltage threshold in order to display the charging condition, similar stepwise display can be made in case of discharging processing for activation of the secondary battery in the steps opposite to those as described hereinabove.

It should be understood that various changes and modifications to the presently preferred embodiments described The invention is claimed as follows:

1. A battery charger comprising:

a charging device for charging a secondary battery;

a voltage detector for detecting a voltage value of the secondary battery; a temperature sensor for sensing an environmental temperature; a controller for sensing an environmental temperature by said sensor and the voltage values of the secondary battery by said voltage detector of the secondary battery before charging to judge a charging condition, the charging condition based on whether a detected voltage value falls within a predetermined range of threshold values, and for receiving voltage values of the secondary battery as detected by said voltage detector at a predetermined time interval while the secondary battery is being charged by said charging device, and for judging a charging condition of the secondary battery based on a rate of change of the received voltage values; and a display for displaying information, wherein said controller controls to display a condition sign that indicates the judged charging condition of the secondary battery on said display, wherein the displayed judged charging condition is classified stepwise to a plurality of successive charging conditions, wherein a first one of the successive charging conditions corresponds to a first predetermined range of threshold values, a second one of the successive charging conditions corresponds to a second predetermined range of threshold values that is higher than the first predetermined range, and a third one of the successive charging conditions IS associated with a third predetermined range of threshold values that is higher than the second predetermined range, and wherein each of the predetermined ranges of threshold values are functions of and are inversely related to the environmental temperature sensed by the sensor; and, wherein said controller performs discharging in a short time before detecting the voltage value of the secondary battery.

2. The battery charger as claimed in claim 1, wherein the plurality of successive charging conditions are classified stepwise to four successive charging conditions which are allocated in accordance with boundaries at a point where a first rise ceases, at a point where a second rise occurs, and a point where the second rise ceases when voltage of the secondary battery shows relatively large two rises, during charging of the second battery, and wherein said controller means judges that the detected charging condition is a next charging condition when one of said points is detected based on a rate of change of the received voltage value from said voltage detector.

3. The battery charger as claimed in claim 1, wherein said controller controls said charging device to temporarily stop charging of the secondary battery when said voltage detector detects voltage value of the secondary battery.

4. A battery charger comprising:

charging means for charging a secondary battery;

voltage detection means for detecting voltage values of the secondary battery;

a temperature sensor for sensing an environmental temperature;

control means for receiving voltage values of the secondary battery as detected by said voltage detection means and environmental temperatures as sensed by said sensor at a predetermined time interval while the secondary battery is being charged by said charging means, for judging a first charging condition of the secondary battery based on a rate of change of the received voltage values, for judging a second charging condition of the secondary battery depending on whether or not the received voltage value falls within a second predetermined range of threshold voltage values, and for judging the first charging condition as the charging condition of the secondary battery when the first charging condition and the second charging condition agree with each other;

a display for displaying information, wherein said controller control means controls to display a condition sign that indicates the judged charging condition of the secondary battery on said display, wherein the displayed judged charging condition is classified stepwise to a plurality of successive charging conditions, wherein a first one of the successive charging conditions corresponds to a first predetermined range of threshold values, a second one of the successive charging conditions corresponds to the second predetermined range of threshold values that is higher than the first predetermined range, and a third one of the successive charging conditions is associated with a third predetermined range of threshold values that is higher than the second predetermined range, and wherein each of the predetermined ranges of threshold values are functions of and are inversely related to the environmental temperature sensed by the sensor;

wherein said control means controls to detect the voltage values of the secondary battery by said voltage detection means as for the secondary battery before charging, and judges the charging condition based on whether the detected voltage value falls within a predetermined range of threshold values; and wherein said control means performs discharging in a short time before detecting the voltage value of the secondary battery.

5. The battery charger as claimed in claim 4, wherein said control means judges the charging condition of the secondary battery as one of said first charging condition and the second charging condition by priority when said first charging condition and said second charging condition do not agree with each other, or the judged charging condition immediately before.

6. The battery charger as claimed in claim 4, wherein the plurality of successive charging conditions are classified stepwise to four successive charging conditions which are allocated in accordance with boundaries at a point where a first rise ceases, at a point where a second rise occurs, and a point where the second rise ceases when voltage of the secondary battery shows relatively large two rises, during charging of the second battery; and said control means judges that the detected charging condition is the next charging condition when one of said points is detected based on a rate of change of the received voltage value from said voltage detection means.

7. The battery charger as claimed in claim 4, wherein
said control means controls said charging means to temporarily stop charging of the secondary battery when said voltage detection means detects voltage value of the secondary battery.

8. A method of judging charging condition comprising:
charging a secondary battery;
detecting voltage values of the secondary battery;
sensing an environmental temperature with a temperature sensor;
controlling sensing of an environmental temperature by said sensor and the voltage values of the secondary battery by said voltage detector of the secondary battery before charging to judge a charging condition, the charging condition based on whether the detected voltage value falls within a predetermined range of threshold values, and receiving of the voltage values of the secondary battery as detected at a predetermined time interval while the secondary battery, is being charged, and judging the charging condition of the secondary battery based on a rate of change of the received voltage values;
controlling display of the judged charging condition of the secondary battery on a display, wherein the displayed judged charging condition is classified stepwise to a plurality of successive charging conditions, wherein a first one of the successive charging conditions corresponds to a first predetermined range of threshold values, a second one of the successive charging conditions corresponds to a second predetermined range of threshold values that is higher than the first predetermined range, and a third one of the successive charging conditions is associated with a third predetermined range of threshold values that is higher than the second predetermined range, and wherein each of the predetermined ranges of threshold values are functions of and are inversely related to the environmental temperature sensed by the sensor; and
wherein said control step performs discharging in a short time before detecting the voltage value of the secondary battery.

9. The method of judging charging condition as claimed in claim 8, wherein
the plurality of successive charging conditions are classified stepwise to four successive charging conditions which are allocated in accordance with boundaries at a point where a first rise ceases, at a point where a second rise occurs, and a point where the second rise ceases when voltage of the secondary battery shows relatively large two rises, during charging of the second battery; and wherein
judging is controlled such that the detected charging condition is a next charging condition when one of said points is detected based on a rate of change of the received voltage value from said voltage detection step.

10. The method of judging charging condition as claimed in claim 8, wherein
charging is controlled to temporarily stop charging of the secondary battery when said voltage detection step detects voltage value of the secondary battery.

11. A method of judging charging condition comprising:
charging a secondary battery;
detecting voltage values of the secondary battery;
sensing an environmental temperature with a temperature sensor;
controlling receiving of the voltage values as detected and environmental temperature as sensed by said sensor while the secondary battery is being charged by said charging step at a predetermined time interval, judging a first charging condition of the secondary battery based on a rate of change of the received voltage values, judging a second charging condition based on whether or not the received voltage values fall within predetermined threshold values, and judging the first charging condition is a charging condition of the secondary battery if the first charging condition and the second charging condition agree with each other;
controlling display of the judged charging condition of the secondary battery on a display, wherein the displayed judged charging condition is classified stepwise to a plurality of successive charging conditions, wherein a first one of the successive charging conditions corresponds to a first predetermined range of threshold values, a second one of the successive charging conditions corresponds to a second predetermined range of threshold values that is higher than the first predetermined range, and a third one of the successive charging conditions is associated with a third predetermined range of threshold values that is higher than the second predetermined range, and wherein each of the predetermined ranges of threshold values are functions of and are inversely related to the environmental temperature sensed by the sensor;
wherein controlling detection of the voltage values of the secondary battery as for the secondary battery before charring, and judges the charging condition based on whether the detected voltage value falls within a predetermined threshold value; and
wherein discharging is controlled in a short time before detecting the voltage value of the secondary battery.

12. The method of judging charging condition as claimed in claim 11, further comprising:
controlling judging of the charging condition of the secondary battery as one of said first charging condition and the second charging condition by priority when said first charging condition and said second charging condition do not agree with any one of each other and the judged charging condition immediately before.

13. The method of judging charging condition as claimed in claim 11, wherein
the plurality of successive charging conditions are classified stepwise to four successive charging conditions which are allocated in accordance with boundaries at a point where a first, rise ceases, at a point where a second rise occurs, and a point where the second rise ceases when voltage of the secondary battery shows relatively large two rises, during charging of the second battery; and
said control step judges that the detected charging condition is a next charging condition when one of said points is detected based on a rate of change of the received voltage value during voltage detection.

14. The method of judging charging condition as claimed in claim 11, wherein
controlling said charging step to temporary stop charging of the secondary battery when voltage detection detects a voltage value of the secondary battery.

15. A method of judging charging condition comprising:
charging a secondary battery; detecting voltage values of the secondary battery; sensing an environmental temperature with a temperature sensor; and controlling sensing of an environmental temperature by said sensor and the voltage values of the secondary battery by said voltage detector of the secondary battery to judge a charging condition, the charging condition based on whether the detected voltage value falls within a predetermined range of threshold values, and receiving of the voltage values of the secondary battery as detected at a predetermined time interval while the secondary battery is being charged, and judging the charging condition of the secondary battery based on a rate of change of the received voltage values; and controlling display of the judged charging condition of the secondary battery on a display, wherein the displayed judged charging condition is classified stepwise to a plurality of successive charging conditions, wherein a first one of the successive charging conditions corresponds to a first predetermined range of threshold values, a second one of the successive charging conditions corresponds to a second predetermined range of threshold values that is higher than the first predetermined range, and a third one of the successive charging conditions is associated with a third predetermined range of threshold values that is higher than the second predetermined range, and wherein each of the predetermined ranges of threshold values are functions of and are inversely related to the environmental temperature sensed by the sensor.

* * * * *